Jan. 8, 1963    B. VER NOOY    3,071,991
SAW APPARATUS

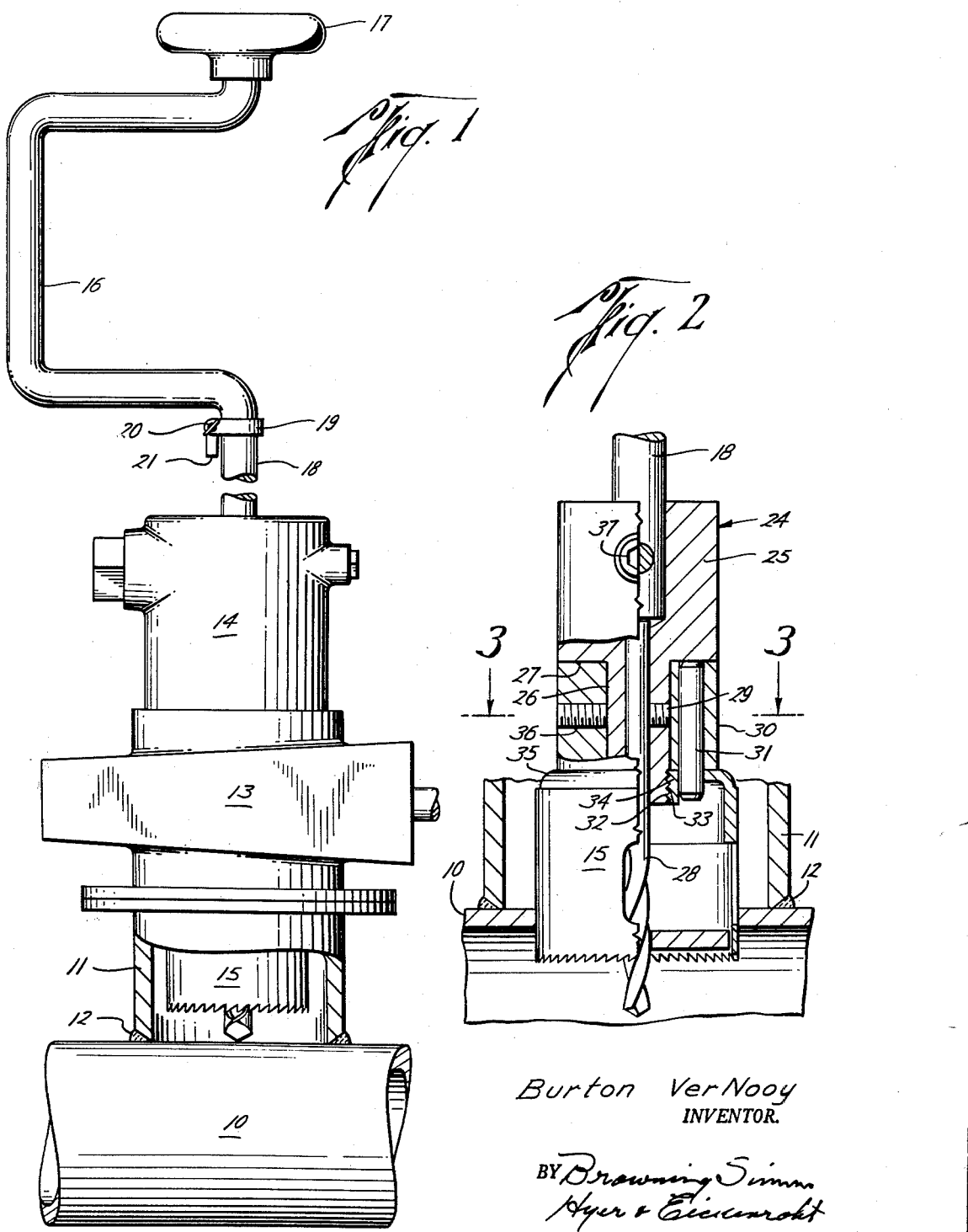

Filed May 12, 1961    2 Sheets-Sheet 2

Burton Ver Nooy
INVENTOR.

BY Browning Simon
Hyer & Eickenroht
ATTORNEYS.

United States Patent Office 3,071,991
Patented Jan. 8, 1963

3,071,991
SAW APPARATUS
Burton Ver Nooy, Tulsa, Okla., assignor to
T. D. Williamson, Inc., Tulsa, Okla.
Filed May 12, 1961, Ser. No. 109,650
7 Claims. (Cl. 77—42)

This invention relates to improved saw apparatus for cutting into a side of a vessel, such as a pipeline which may contain fluid under pressure.

In the operation of pipelines or other vessels containing fluid under pressure, it is frequently necessary to cut into a containing vessel to attach a branch line or other apparatus and it is desirable to do so without decreasing pressure on fluid in the vessel. For example, if a pipeline should develop a leak, it is customary to cut into the pipeline on either side of the leak and to install a bypass loop of pipe around a section of the line to be repaired. The leaky section is then plugged off and service is maintained through the bypass loop while the defective section is replaced or repaired.

Cutting into a line or other vessel containing fluid under pressure in this manner ordinarily is referred to in the trade as "hot tapping." To make a hot tap, a split T or nipple is usually welded to the pipeline at a point where the tap is to be made. A tapping valve is attached to the T or nipple and a hot tapping machine is mounted on the tapping valve in fluid-tight relationship therewith. Thus, the interior of the T or nipple, the tapping valve and the housing of the tapping machine form a fluid-tight chamber in which the cutting operation is performed.

The cutting operation is conducted by opening the tapping valve and inserting a cutter, which may be a cylindrical saw, through the open valve and cutting out a section of "coupon" from the vessel or line. After the coupon is cut out, the cutter is withdrawn through the open tapping valve and a plugging device is inserted to plug the pipeline.

When a cutter of this type is used, it is conventional to include a central pilot bit in a cylindrical saw, concentric therewith, to center the saw upon the location to be cut and to assist in steadying the saw against wobble during the cutting operation. The pilot bit also may serve to withdraw the coupon which is cut out of the line to prevent it from becoming lost inside the line where it might interfere with the operation of valves and similar equipment.

Hot tapping thus permits continuing use of the pipeline during the repair operations and also avoids the necessity of draining long sections of the pipeline back to the nearest block valves on either side of the leaky section in order to make a repair and eliminates the necessity of extensive cleaning of the line before it is returned to operation.

A great many types of hot tapping machines are on the market at present, and many of these are very effective and efficient in operation; but prior devices of this sort present problems in their manufacture and sale in the low-cost market. Low manufacturing cost, simplicity, portability and light weight are essential in devices of this type for use with municipal water and gas distribution systems where hot tapping devices have not been widely used because of their expense, weight and size. The device of the present invention is especially useful in application to low pressure pipelines as are common in the municipal utility field although it can be adapted for use in tapping into pipelines and other pressure vessels operated at high pressure. Its lightness, simplicity and portability make it especially valuable for use in the utility field. It is accordingly an object of this invention to provide an improved saw apparatus for cutting into the side of a vessel which is particularly useful for hot tapping into water and gas distribution systems of a municipality.

Another object is to provide a simplified light weight saw apparatus which is particularly suitable for manual operation and which does not require heavy or complicated drive mechanisms in its operation.

Another object is to provide an improved saw and saw holder assembly in which all play between a saw and holder is eliminated by a construction which is low in cost and light in weight.

Another object is to provide an improved saw apparatus for cutting into a side of a vessel in which rotational, longitudinal or lateral movement of an actuating rod outside a housing containing the saw causes corresponding movement of a saw within the housing and in which the position of the saw in the housing can be determined easily.

Another object is to provide a saw apparatus of this type in which progress of the cutting operation to predetermined depth is indicated by means outside a housing containing a saw.

Another object is to provide an improved saw, saw holder and pilot bit assembly in which loosening of the saw and pilot bit on the holder during cutting operation is effectively prevented.

Another object is to provide an improved saw and saw holder combination which is interchangeable upon an actuating rod with a plug member of my co-pending application Serial No. 61,429, filed October 10, 1960, so a minimum of equipment may be used for cutting into a side of a pipe and plugging the cut pipe with corresponding lowering of cost, weight and bulk of all apparatus required.

Briefly, the improved saw holder of the present invention comprises a body including two cylindrical sections of different diameter, thus providing a shoulder on the body at the junction of the section of larger diameter and with the smaller section. The sections are coaxial in arrangement. When a pilot bit is to be used with the saw, the smaller body section is drilled to provide a central socket for the shank of the pilot bit and is provided with a threaded opening normal to the axis of the socket to receive a set screw so that it may bear firmly upon the bit with the head of the set screw below the exterior surface of the body section and within the opening.

An annular pin ring is arranged to fit upon the exterior of the body section of smaller diameter and to abut the shoulder formed by the junction of the smaller and larger sections of the body. This annular pin ring has a number of longitudinal openings through it parallel to the axis of the body and the pin ring. These openings are disposed substantially equidistant from each other upon the circumference of a circle, preferably of such size that it may enclose a nipple on a later-described saw. The pin ring also has a threaded opening through it normal to the axis of the member and the body, thus providing for the reception of a set screw to hold the pin ring firmly against the exterior surface of the smaller body section.

The outer end of the smaller body section is threaded on its exterior surface in position to cooperate with an interiorly threaded nipple on a saw to apply longitudinal pressure upon the pin ring. Preferably, the threads on the smaller section of the body extend from this outer end toward the larger body section for a distance sufficient that the unthreaded portion of the smaller body member is shorter than the length of the pin ring.

A cylindrical saw is provided having a series of saw teeth around the circumference of one end and having the other end closed by a wall. A centrally located nipple having its interior surface threaded is formed on the wall within the saw, and an opening through the nipple extends through the nipple and wall so that the nipple may be screwed upon the threads on the smaller body section to apply longitudinal pressure on the pin ring. The wall also has a series of openings through it matching in size and location the series of openings through the pin ring and tightly fitting pins are driven into each of these openings through the wall of the saw and in the pin ring. The tight fit of these pins and pressure of the wall against the pin ring brace the saw against any lateral wobbling movement while the pins effectively prevent any rotation of the saw member respective to the body and thus prevent it from becoming loosened thereon during use.

The end of the body opposite the saw is equipped with means for attaching an actuating rod thereto which preferably is a central socket arranged to receive a cylindrical actuating rod and a cap screw in a threaded opening in the body to retain the rod in place. It will be seen that a rigid attachment of the saw in axial alignment with the actuating rod is easily obtained.

Normally, a saw of this type is used in a fluid-tight chamber attached to a side of a vessel to be cut into. The attachment is made by welding a nipple to a side of the vessel, mounting a tapping valve thereon, and attaching a housing for the saw to the tapping valve so that the nipple, tapping valve and housing cooperate to form a fluid-tight chamber in which the saw is operated. This chamber has a circular opening in the housing wall opposite to the vessel, and the actuating rod for the saw extends through this opening. An annular sealing means is disposed in the wall of the housing in position to maintain a fluid-tight seal between the actuating rod and the housing.

The actuating rod preferably is continuous with a manually operable crank located outside the housing so that the saw is manually operable. The presence of the seal around the actuating rod in the housing enables the saw to be moved laterally or longitudinally or to be rotated by manipulation of the crank, and the position of the saw is easily determined by noting the position of the actuating rod.

The actuating rod also carries an adjustable clip having a stop attached thereto so that rotation of the rod may be halted by the operator when the stop encounters the upper surface of the housing.

It will be seen that the depth to which the saw is desired to penetrate may be predetermined by setting the clip at whatever location on the actuating rod is required and that the degree of penetration of the cutter at any time will be indicated by the distance between the end of the stop and the top of the housing; and thus there is no danger of cutting too far and penetrating through the wall of the vessel opposite that intended to be cut. The entire equipment of this sort is very light in weight, portable, easy to operate and can be manufactured at low cost. The connection between the saw and the saw holder within the housing is an extremely rigid one although it is quite easy to assemble and disassemble.

In the attached drawings, wherein like reference numerals are used to indicate like parts:

FIG. 1 is an elevation, partly in section, of the improved saw assembly of the present invention attached to a pipeline in cutting position;

FIG. 2 is an elevation, partly in section, showing the relationship between the saw holder body, pin ring, pins, saw and saw holder assembly of the present invention;

Figure 3:
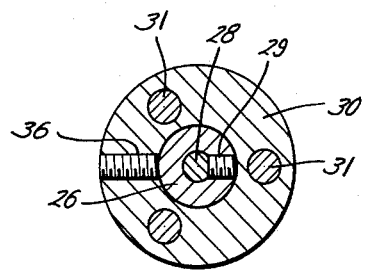
FIG. 3 is a cross section through the apparatus of FIG. 2 on the line 3—3.

In FIG. 1, the reference numeral 10 indicates a pipeline having a nipple 11 attached thereto in fluid-tight relationship, illustrated as by welds 12. A tapping valve 13 is attached to the nipple, and housing 14 is mounted on the tapping valve, thus the nipple 11, the housing of valve 13 and the housing 14 cooperate to form a fluid-tight chamber.

A cylindrical saw 15 having a series of cutting teeth around its circumference is disposed in the fluid-tight chamber for longitudinal movement and for moderate lateral movement as well as rotation. In the particular device illustrated, the saw is manually operable by means of a crank 16 having a thrust handle 17 and connected to an actuating rod 18 for actuation of the saw.

Actuating rod 18 has an adjustable clip 19 which may be locked upon its exterior in any position desired by manipulation of a wing nut 20. A stop 21 is carried by clip 19 in position to contact the upper surface of housing 14 when the saw has penetrated into line 10 to the desired depth, and thus to indicate completion of the cutting operation.

Figure 4:
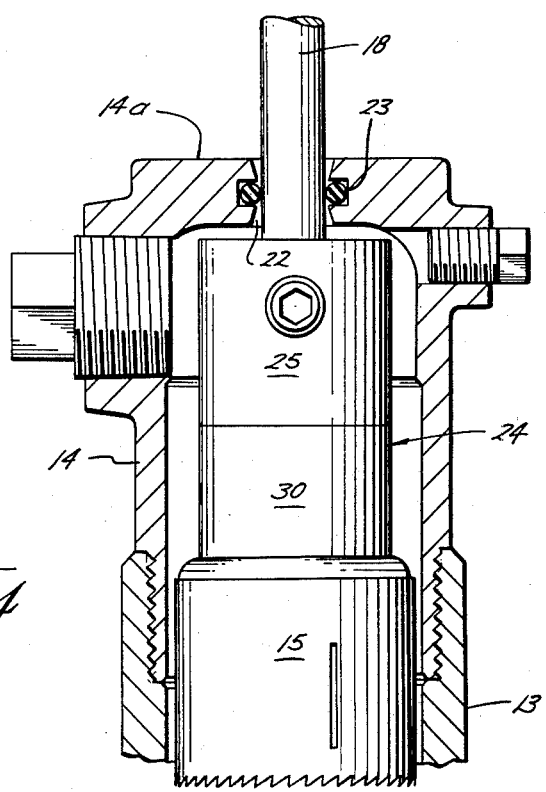
FIG. 4 is a vertical section through the housing illustrated in FIG. 1 showing the relationship of the saw, actuating rod and housing.

The saw 15 is held by a saw holder and attached to the actuating rod 18, as best shown in FIG. 4. The housing 14 has a circular opening 22 through its end 14a opposite to the line 10. The opening 22 preferably tapers from a larger diameter at each of the surfaces of the top of the housing 14a to a point of minimum diameter about midway of the housing. A resilient sealing means, illustrated as O-ring 23, is disposed in the wall of the housing in position to maintain a fluid-tight seal between the wall of the housing and actuating rod 18.

The rod 18 introduced through a seal in this manner may be rotated, moved longitudinally or tipped to give limited lateral movement to a saw 15 disposed coaxially with rod 18. The position of the saw is of course obvious from inspection of the position of the actuating rod outside the housing. The movable clip 19 is clamped on the housing at any desired location so that stop 21 will contact the top 14a of the housing when the saw is penetrated to a desired depth. The housing 14 and actuating rod 18 thus may form a part of the present saw assembly and are usable with the pipe plugging member of the plugger described in my co-pending application, Serial No. 61,429, filed October 10, 1960, so that only one housing and actuating rod are required to cooperate with a saw and a plug to furnish complete apparatus for both cutting into and plugging pipe.

The saw holder comprises a body, indicated generally as 24, having a section 25 of larger diameter and a section 26 of smaller diameter coaxial therewith.

In the device illustrated, a pilot bit 28 has its shank inserted into a central socket formed in body section 26 and held firmly therein by a set screw 29 screwed into a threaded opening in the body member 26 normal to the axis thereof. The set screw 29 must be short enough that its head does not project outward from the surface of the smaller body section 26.

An annular pin ring 30 is fitted upon and enclosed in the smaller body member 26 and makes firm contact with shoulder 27 formed by the junction of the body sections of larger and smaller diameter. This pin ring has a series of longitudinal openings therethrough suitable to receive pin 31 substantially equidistant from each other on the circumference of a circle large enough to enclose nipple 34.

The smaller body member 26 has screw threads on its exterior surface adjacent to the end of the body in position to cooperate with threads 33 on an interiorly threaded nipple 34 to exert pressure upon pin ring 30. The cylindrical saw 15 has its end opposite to the end carrying saw teeth closed by wall 35 with which nipple 34 preferably is made integral. Thus, the threaded opening through the nipple 34 extends through the nipple and through the wall of the saw. The wall 35 also has a series of openings therethrough equal in number and matching the openings in pin ring 30 for receiving pins 31. The pins 31 tightly fit the openings in the wall of the saw member and in the pin ring 30.

This construction gives an extremely rigid connection between the saw and the saw holder, and it is very easily assembled. In assemblying the device, the shank of pilot bit 28 is inserted into the saw in the body and the set screw 29 is tightened thereupon to hold the shank immovably in the socket. Pin ring 30 is then slipped upon the exterior surface of the smaller body section 26 into firm contact with shoulder 27 and the nipple 34 of the saw member is screwed on the threaded end of a smaller body member to bring the openings in the wall 35 into alignment with the openings in pin ring 30. Pins 31 are then driven home through openings in the wall 35 and pin ring 30, and a set screw 36 is tightened to prevent any play between the exterior surface of body member 26 and the interior surface of pin ring 30. The pins 31 cooperate with the wall 35 of the saw member and with the pin ring 30 to prevent any loosening of the saw during operation, and the pressure of set screw 36 effectively prevents any wobble or play between the smaller body member and the pin ring.

The body is equipped with means for attaching the actuating rod 18, illustrated as a central socket in the larger body member fitting the rod and a cap screw 37 in the body member to prevent loosening of the rod from the body.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A saw assembly for cutting an opening into a vessel comprising in combination a fluid-tight housing connected to the vessel having an opening through a wall thereof opposite to the vessel; an externally operable handle including a cylindrical rod movably extending through said opening; resilient seal means in the opening sealing between the rod and housing wall; a saw holder within the housing rigidly connected to the rod coaxially therewith, including a body having coaxial cylindrical sections of larger and smaller diameter; an annular pin ring around but substantially shorter than the body section of lesser diameter, said pin ring having a plurality of longitudinal openings therethrough disposed substantially equidistant from each other on the circumference of a circle; external screw threads on the body section of smaller diameter located thereon to cooperate with a threaded saw member to apply pressure on the pin ring; a cylindrical saw member having a series of cutting teeth around one end and having the other end closed by a wall; a central nipple on the wall within the saw member having an internally threaded opening extending therethrough and through the wall receiving the external threads on the smaller body member; a series of openings through the wall matching the longitudinal openings through the pin ring; and tightly fitting pins extending through each of said openings through the wall and pin ring.

2. Apparatus for cutting an opening into a vessel comprising in combination a fluid-tight housing attached to a side of a vessel having a circular opening in a wall thereof opposite the vessel; a handle, including an externally operable crank and a cylindrical rod movably extending through said opening; resilient seal means in the opening sealing between the rod and housing wall; a saw holder within the housing rigidly connected to the rod coaxially therewith, including a body having coaxial cylindrical sections of larger and smaller diameter; a pilot bit detachably connected to the section of smaller diameter in axial alignment therewith; an annular pin ring around but substantially shorter than the body section of lesser diameter, said pin ring having a plurality of longitudinal openings therethrough substantially equidistant from each other on the circumference of a circle; external screw threads on the body section of smaller diameter extending from an end of the body to a location nearer to the body section of larger diameter than the length of the annular pin ring; a cylindrical saw member having a series of cutting teeth around one end and having the other end closed by a wall; a central nipple on the wall within the saw member having an internally threaded opening therethrough extending through the wall receiving the external threads on the smaller body member; a series of openings through the wall matching the longitudinal openings through the pin ring; and tightly fitting pins extending through each of said openings through the wall and pin ring.

3. An apparatus for cutting into the side of a vessel comprising in combination a fluid-tight housing attached to a side of the vessel having a circular opening in a wall thereof opposite to the vessel; a handle including an externally operable crank and a cylindrical rod connected thereto movably extending through said opening; resilient seal means in the opening disposed to seal between the rod and housing wall; a saw holder within the housing rigidly connected to the rod coaxially therewith, including a body having coaxial cylindrical sections of larger and smaller diameter, said section of smaller diameter having a central socket therein; a pilot bit having a shank fitting said socket disposed therein and a set screw in said body section disposed to hold the shank firmly in the socket; an annular pin ring around but substantially shorter than the body section of lesser diameter, said pin ring having a series of longitudinal openings therethrough disposed upon the circumference of a circle substantially equidistant from each other; external screw threads on the body section of smaller diameter in position to cooperate with the threaded saw member to apply pressure on the pin ring longitudinally thereof; a cylindrical saw member having a series of cutting teeth around one end and the other end closed by a wall; a central nipple on the wall within the saw member having an internally threaded opening extending therethrough and through the wall receiving the external threads on the smaller body member; a series of openings through the wall around the exterior of the nipple matching and forming continuation of the longitudinal openings through the pin ring; and tightly fitting pins extending through each of said openings in the wall and pin ring.

4. Apparatus for cutting an opening into the side of a vessel comprising in combination a fluid-tight housing attached to a side of a vessel having a circular opening in a wall thereof opposite the vessel; a handle including a crank outside said housing and a cylindrical rod attached thereto movably extending through said opening; resilient seal means in the opening disposed to seal between the rod and housing wall; a pilot bit having a shank disposed in a central socket in the end of said body section of smaller diameter; a set screw extending through said body member of lesser diameter normal to the axis of said socket at a location covered by a pin ring; an annular pin ring around but substantially shorter than the body section of lesser diameter, said pin ring having a plurality of longitudinal openings therethrough disposed substantially equidistant from each other upon the circumference of a circle; external screw threads on the body section of smaller diameter in position to cooperate with a threaded nipple to apply pressure on the pin ring; a cylindrical saw member having a series of cutting teeth around one end and having the other end closed by a wall; a central nipple on the wall within the saw member having an internally threaded opening therethrough extending through the saw member and receiving the external threads on the smaller body member; a series of openings through the wall matching the longitudinal openings through the pin ring; tightly fitting pins extending through each of said openings in the wall and pin ring; and a set screw extending through the pin ring normal to the smaller body member preventing rotation of the pin ring upon said body section.

5. Apparatus for cutting into a vessel comprising in combination a handle including an actuating rod and a crank attached thereto; a saw holder rigidly but detachably connected to the rod coaxially therewith, including a body having coaxial cylindrical sections of larger and smaller diameter, an annular pin ring around but substantially shorter than the body section of lesser diameter, said pin ring having a plurality of longitudinal openings therethrough disposed substantially equidistant from each other upon the circumference of a circle; external screw threads on the body section of smaller diameter in position to cooperate with a threaded nipple to apply longitudinal pressure on the pin ring; a cylindrical saw member having a series of cutting teeth around one end and having the other end closed by a wall; a central nipple on the wall within the saw member having an internally threaded opening extending through the nipple and wall receiving the external threads on the smaller body member; a series of openings through the wall matching the longitudinal openings through the pin ring; and tightly fitting pins in each of said openings in the wall and pin ring.

6. Apparatus for cutting into a vessel comprising in combination a saw holder including a body having coaxial cylindrical sections of larger and smaller diameter; a pilot bit detachably connected to the section of smaller diameter in axial alignment therewith; an annular pin ring around but substantially shorter than the body section of lesser diameter, said pin ring having a plurality of longitudinal openings therethrough disposed substantially equidistant from each other upon the circumference of a circle; external threads on the body section of smaller diameter in position to cooperate with a threaded nipple to apply longitudinal pressure on the pin ring; a cylindrical saw member having a series of cutting teeth around one end and having the other end closed by a wall; a central nipple on the wall within the saw member having an internally threaded opening extending through the nipple and through the wall, receiving the external threads on the smaller body member; a series of openings through the wall matching the longitudinal openings through the pin ring; and tightly fitting pins extending through each of said openings in the wall and pin ring.

7. Apparatus for cutting into a vessel comprising in combination a saw holder, including a body having coaxial cylindrical sections of larger and smaller diameter; a pilot bit having a non-circular shank axially disposed in a matching socket in the body section of smaller diameter; a set screw disposed through the smaller body member in position to apply pressure upon said shank and located in position to be covered by a later-mentioned pin ring; an annular pin ring around but substantially shorter than the body section of lesser diameter, said pin ring having a plurality of longitudinal openings therethrough disposed substantially equidistant from each other upon the circumference of a circle; external screw threads on the body section of smaller diameter in position to cooperate with a threaded nipple to apply pressure on the pin ring; a cylindrical saw member having a series of cutting teeth around one end and the other end closed by a wall; a central nipple on the wall within the saw member having an internally threaded opening extending through the nipple and wall, receiving the external threads on the smaller body section; a series of openings through the wall around the nipple and matching the longitudinal openings through the pin ring; and tightly fitting pins extending through each of said openings in the wall and pin ring.

References Cited in the file of this patent

UNITED STATES PATENTS

| 2,794,469 | Shortell | June 4, 1957 |
| 2,972,915 | Milanovits et al. | Feb. 28, 1961 |

OTHER REFERENCES

Marvel Saw Advertisement, received in Patent Office on May 23, 1949, and on file in Div. 58.